United States Patent
Mishra et al.

(10) Patent No.: US 6,907,380 B2
(45) Date of Patent: Jun. 14, 2005

(54) COMPUTER IMPLEMENTED SCALABLE, INCREMENTAL AND PARALLEL CLUSTERING BASED ON WEIGHTED DIVIDE AND CONQUER

(75) Inventors: Nina Mishra, San Ramon, CA (US); Liadan O'Callaghan, Mountain View, CA (US); Sudipto Guha, Chatham, NJ (US); Rajeev Motwani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/726,254

(22) Filed: Dec. 1, 2003

(65) Prior Publication Data

US 2004/0122797 A1 Jun. 24, 2004

Related U.S. Application Data

(63) Continuation of application No. 09/854,212, filed on May 10, 2001, now Pat. No. 6,684,177.

(51) Int. Cl.[7] .................... G06F 101/14; G06F 17/18; G06F 17/30
(52) U.S. Cl. ............................. 702/179; 707/6
(58) Field of Search ................ 702/80, 97, 1.58, 702/179–181, 187; 707/6, 7

(56) References Cited

U.S. PATENT DOCUMENTS

| | | | |
|---|---|---|---|
| 5,187,751 A | | 2/1993 | Tanaka |
| 5,329,596 A | | 7/1994 | Sakou et al. |
| 6,003,029 A | | 12/1999 | Agrawal et al. |
| 6,003,036 A | * | 12/1999 | Martin ........................ 707/102 |
| 6,021,383 A | | 2/2000 | Domany et al. |
| 6,115,708 A | * | 9/2000 | Fayyad et al. .................. 707/6 |
| 6,236,978 B1 | * | 5/2001 | Tuzhilin ....................... 705/26 |
| 6,397,166 B1 | * | 5/2002 | Leung et al. ................ 702/179 |
| 6,684,177 B2 | * | 1/2004 | Mishra et al. ............... 702/179 |
| 2002/0052692 A1 | * | 5/2002 | Fahy ............................ 702/19 |
| 2002/0099702 A1 | | 7/2002 | Odd |

FOREIGN PATENT DOCUMENTS

EP         1191459 A1     3/2002

* cited by examiner

*Primary Examiner*—Marc S. Hoff
*Assistant Examiner*—Manuel L. Barbee

(57) ABSTRACT

A technique that uses a weighted divide and conquer approach for clustering a set S of n data points to find k final centers. The technique comprises 1) partitioning the set S into P disjoint pieces $S_1, \ldots, S_P$; 2) for each piece $S_i$, determining a set $D_i$ of k intermediate centers; 3) assigning each data point in each piece $S_i$ to the nearest one of the k intermediate centers; 4) weighting each of the k intermediate centers in each set $D_i$ by the number of points in the corresponding piece $S_i$ assigned to that center; and 5) clustering the weighted intermediate centers together to find said k final centers, the clustering performed using a specific error metric and a clustering method A.

18 Claims, 6 Drawing Sheets

COMPUTER IMPLEMENTED SCALABLE, INCREMENTAL AND PARALLEL CLUSTERING BASED ON WEIGHTED DIVIDE AND CONQUER

CROSS REFERENCE TO RELATED APPLICATIONS

This application is a continuation application of U.S. patent application Ser. No. 09/854,212, entitled "Computer Implemented Fast, Approximate Clustering Based on Sampling", filed on May 10, 2001 now U.S. Pat. No. 6,684,177.

FIELD OF THE INVENTION

The present invention is directed toward the field of computer implemented clustering techniques, and more particularly toward methods and apparatus for divide and conquer clustering.

BACKGROUND

In general, clustering is the problem of grouping data objects into categories such that members of the category are similar in some interesting way. The field of clustering spans numerous application areas, including data mining, data compression, pattern recognition, and machine learning. More recently, with the explosion of the Internet and of information technology, "data stream" processing has also required the application of clustering. A "data stream" is an ordered sequence of data points that can only be read once or a small number of times. Some applications producing data streams are customer clicks (on a web site, for example), telephone records, multimedia data, web page retrievals and so on whose data sets are too large to fit in a computer main memory and must be stored first prior to clustering being applied.

The computational complexity of the clustering problem is very well understood. The existence of an efficient optimum clustering algorithm is unlikely, i.e., clustering is "NP-hard". Conventional clustering methods thus seek to find approximate solutions.

In general, conventional clustering techniques are not designed to work with massively large and dynamic datasets and thus, do not operate well in the context of say, data mining and data stream processing. Most computer implemented clustering methods are based upon reducing computational complexity and often require multiple passes through the entire dataset. Thus, if the dataset is too large to fit in a computer's main memory, the computer must repeatedly swap the dataset in and out of main memory (i.e., the computer must repeatedly access an external data source, such as a hard disk drive). Furthermore, for data stream applications, since the data exceeds the amount of main memory space available, clustering techniques should not have to track or remember the data that has been scanned. The analysis of the clustering problem in the prior art has largely focused on its computational complexity, and not on reducing the level of requisite input/output (I/O) activity. When implementing the method in a computer, there is a significant difference (often by a factor of $10^6$) in access time between accessing internal main memory and accessing external memory, such as a hard disk drive. As a result, the performance bottleneck of clustering techniques that operate on massively large datasets is often due to the I/O latency and not the processing time (i.e., the CPU time).

The I/O efficiency of clustering techniques under different definitions of clustering has also been studied. Some techniques are based on representing the dataset in a compressed fashion based on how important a point is from a clustering perspective. For example, one conventional technique stores those points most important in main memory, compresses those that are less important, and discards the remaining points. Another common conventional technique to handle large datasets is sampling. For example, one technique illustrates how large a sample is needed to ensure that, with high probability, the sample contains at least a certain fraction of points from each cluster. The sampling-based techniques apply a clustering technique to the sample points only. Other techniques compress the dataset in unique ways. One technique, known popularly as Birch, involves constructing a tree that summarizes the dataset. The dataset is broken into subclusters and then each subcluster is represented by the mean (or average value) of the data in the subcluster. The union of these means is the compressed dataset. However, Birch requires many parameters regarding the data that must be provided by a knowledgable user, and is sensitive to the order of the data. Generally speaking, all these typical approaches do not make guarantees regarding the quality of the clustering.

Clustering has many different definitions of quality, and for each definition, a myriad of techniques exist to solve or approximately solve them. One definition of clustering quality is the so-called "k-median" definition. The k-median definition is as follows: find k centers in a set of n points so as to minimize the sum of distances from data points to their closest cluster centers. A popular variant of k-median finds centers that minimize the sum of the squared distances from each point to its nearest center. "k-center" clustering is defined as minimizing the maximum diameter of any cluster, where the diameter is the distance between the two farthest points within a cluster. Most techniques for implementing k-median and similar clustering have large space requirements and involve random access to the input data.

Accordingly, it is desirable to develop a clustering technique with quality of clustering guarantees that operates on massively large datasets for efficient implementation in a computer.

SUMMARY

What is disclosed is a technique that uses a weighted divide and conquer approach for clustering a set S of n data points to find k final centers. The technique comprises 1) partitioning the set S into P disjoint pieces $S_1, \ldots, S_P$; 2) for each piece $S_i$, determining a set $D_i$ of k intermediate centers; 3) assigning each data point in each piece $S_i$ to the nearest one of the k intermediate centers; 4) weighting each of the k intermediate centers in each set $D_i$ by $w_i$ the number of points in the corresponding piece $S_i$ assigned to that center; and 5) clustering the weighted intermediate centers together to find said k final centers, the clustering performed using a specific quality metric and a clustering method A.

In some embodiments of the invention, P is chosen such that each piece $S_i$ obeys a constraint $|S_i|<M$, where M is the size of a memory or portion thereof. In other embodiments, weighted intermediate centers are found for each piece $S_i$ in a parallel fashion. In some embodiments, sets of data points can be incrementally added to already clustered data sets by finding weighted intermediate centers for the incremental set, and then clustering those weighted intermediate centers with weighted intermediate centers found from the previously clustered data sets.

DETAILED DESCRIPTION OF THE INVENTION

Figure 1:
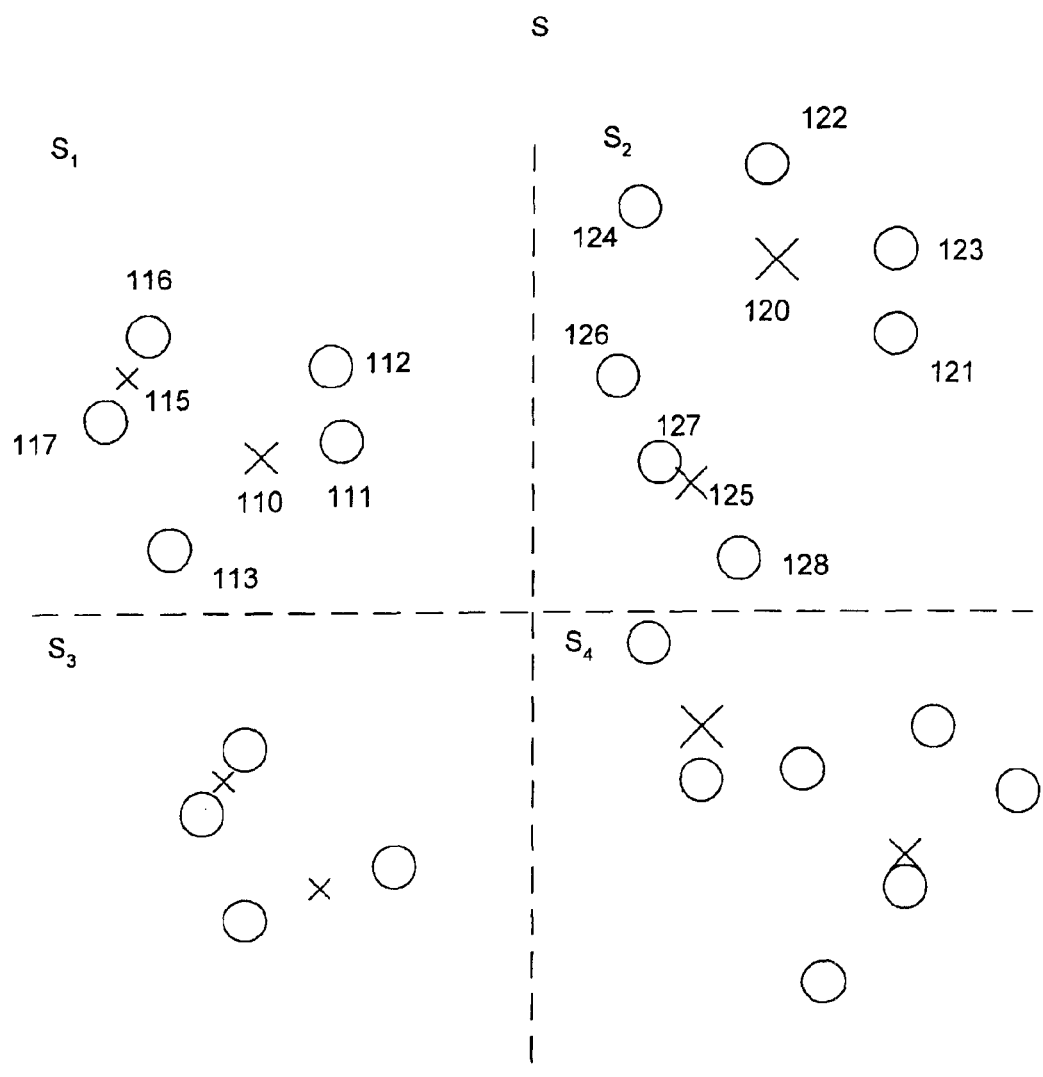
FIG. 1 illustrates the initial partitioning step of weighted divide and conquer according to one or more embodiments of the invention.

The description of the invention uses the term "clustering method" to refer to a specific, known algorithm to find a number of centers, medians and other groupings from a set of data given a specific quality metric. The description refers elsewhere to "clustering technique" to indicate the weighted divide and conquer technique that utilizes a "clustering method" in its processing. The clustering method may be any clustering method known or yet to be discovered and is used as a part of the weighted divide and conquer technique of the invention, and not a substitute thereof.

The weighted divide and conquer technique of the present invention has application for use in data stream processing and data mining, among others. These applications require a clustering technique with quality and performance guarantees. The data stream processing and data mining applications require manipulation of datasets that are massively large and dynamic in nature. Due to the size of the datasets generated by these applications, computer implemented clustering requires significant computer resources. As described fully below, the weighted divide and conquer technique of the present invention significantly improves the utilization efficiency of computer resources, including reducing input/output (I/O) operations and permitting execution of parallel methods. Additionally, the weighted divide and conquer method of the present invention can be performed incrementally, such that new data points that are added to the original do not require passing through the entire combined dataset again.

In general, the weighted divide and conquer technique reduces a large problem (i.e., clustering large datasets) to many small or "sub-problems" for independent solution. In one embodiment, the "sub problems" are divided to a size small enough to fit in main memory of the computer. Also, these small or sub-problems can be computed incrementally. Furthermore, these sub-problems may be distributed across multiple processors for parallel processing. All of these advantages can be obtained while still maintaining certain guarantees about the quality of the clustering itself. The technique of the present invention maintains a constant-factor approximation to optimum clustering while doing so in each small divided space.

The weighted divide and conquer technique of the present invention can be summarized as follows:

1) The entire dataset S is first partitioned into P disjoint pieces. In one embodiment, each of the pieces are made small enough to fit in main memory.

2) For each piece, k medians (centers) are found such that they satisfy a particular clustering definition metric (such as minimizing the sum of squared distances).

3) Each data point in each piece is assigned to its closest center chosen from the centers found in 2).

4) Each of the k centers found in 2) in each piece is then weighted by the number of data points that are assigned to it.

5) The weighted intermediate centers are merged into a single dataset.

6) The merged set of weighted intermediate centers are clustered again to find a final k centers among them. In alternate embodiments of the invention, the once weighted clustered centers can be repeatedly re-clustered and re-weighted so as to use less memory. Further, as discussed below, the technique can be executed in parallel processes since one piece does not depend upon the other for the computation of their centers.

FIG. 1 illustrates the initial partitioning step of weighted divide and conquer according to one or more embodiments of the invention. According to the invention, a dataset S (which is a collection of "data points"), which may be of a size larger than that which is able to fit in the main memory of a device implementing clustering, is partitioned into an arbitrary number of pieces P. In the example of FIG. 1, P is set equal to 4, and hence, the space S of data points is partitioned into four pieces $S_1$, $S_2$, $S_3$ and $S_4$. The partitions do not have to be uniform in size or shape and are completely arbitrary. The partitioning makes use of no assumption about the number of data points within each partition, and thus uses insignificant computational resources (in comparison to other operations in clustering).

In one embodiment of the invention, each piece $S_i$ (i ranging from 1 to P) is at least guaranteed to be able to fit within a given memory space, such as the memory space available in a main memory (or portion) of the computing device that will perform clustering. In other embodiments, if the size of each piece $S_i$ is too large to fit into a given/required memory space, then the weighted divide and conquer is recursively performed until each result piece can be processed in that given/required memory space.

According to the invention, after the partitioning of the dataset S, each piece is clustered according to some metric (and clustering method). For example, the metric for distance-based k-median clustering demands that k centers (medians) be found such that the average distance between each data point and its nearest center is minimized. Thus, referring to FIG. 1, with k=2, clustering finds 2 centers for each piece $S_1$, $S_2$ etc. (centers are indicated by an "X"). For instance, in space $S_1$, clustering may result in finding a center 115 and a center 110. Likewise, in space $S_2$ clustering would find a center 120 and a center 125. In one embodiment of the invention, the domain of points is continuous, such that the various centers do not have to correspond to one of the data points (as shown in FIG. 1). In other embodiments of the invention, where the domain is discrete, each center must correspond to an actual data point.

Next, each data point is assigned to its nearest center. Thus, in piece $S_1$, the data points 116 and 117 would be assigned to their nearest center, which is center 115. Likewise, data points 111, 112 and 113 would be assigned to their nearest center, center 110. Considering piece $S_2$, data points 121, 122, 123 and 124 are all assigned to their nearest center, which is center 120. Likewise, data points 126, 127, 128 are also assigned to center 125. The centers for pieces S3 and S4 are shown but not described and would follow the same metrics used to find the centers for pieces $S_1$ ad $S_2$.

If the space was discrete, then the location of each center would correspond exactly with one of the data points therein. Thus, for instance, in the discrete case, the location of center 125 would be made to coincide exactly with the location of data point 127.

Once each of the data points has been assigned to its nearest center, the centers are then "weighted" by the total number of data points assigned to them. Thus, center 110 would carry a weight of 3, since there are three points (points 111, 112 and 113) assigned to it. Center 115 would have a lower weighting of 2 since only two points are assigned to it. Likewise, center 125 in piece $S_2$ would be assigned a weighting of 3 while center 120 would be assigned a weighting of 4. These relative weightings are indicated in FIG. 1 by varying the size of the marking for each center accordingly.

In accordance with the invention, these weighted centers are merged and again clustered (not shown in FIG. 1). The result of clustering these weighted centers is the final set of centers. This is more fully illustrated in FIG. 2.

Figure 2:
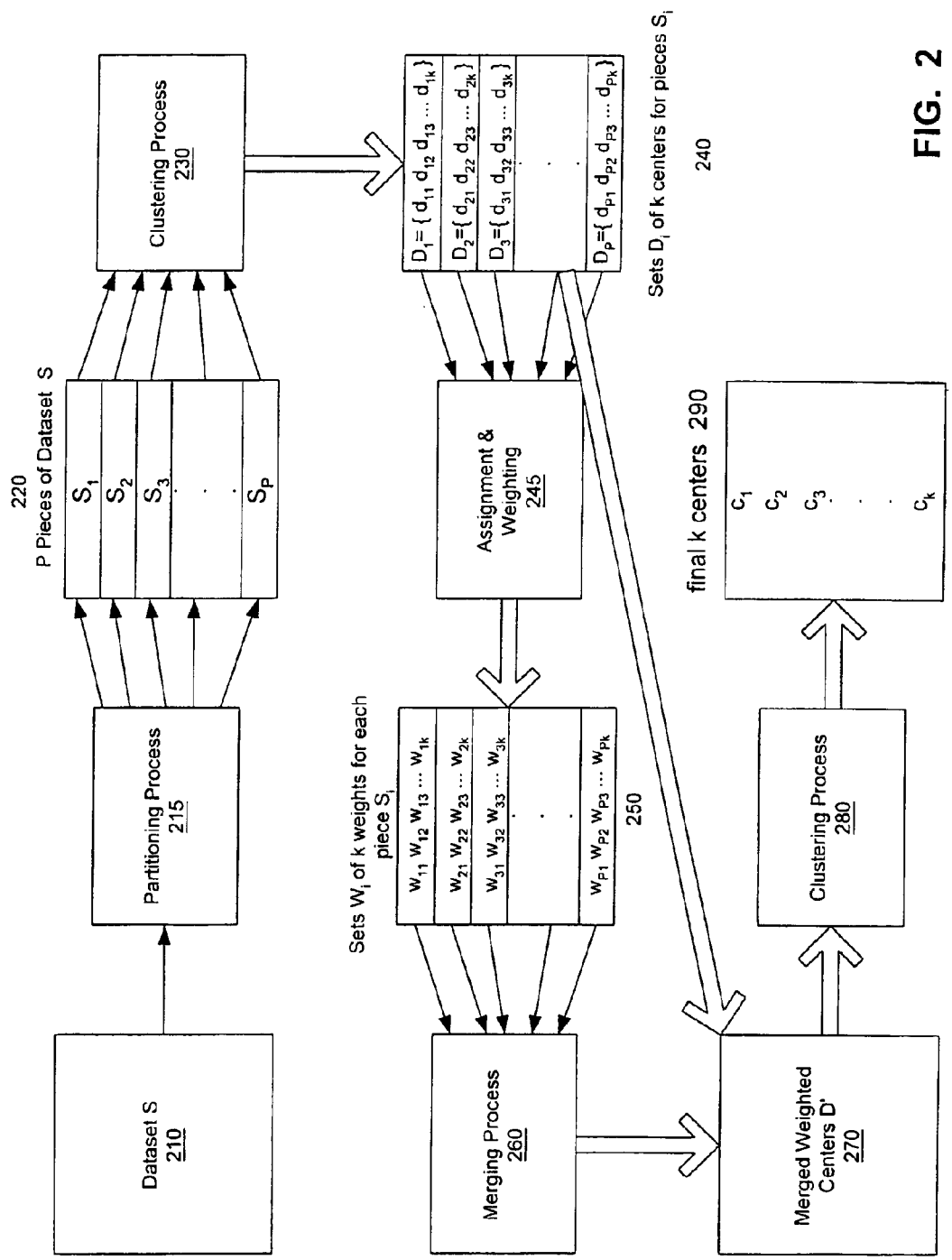
FIG. 2 is a block diagram illustrating the methodology underlying weighted divide and conquer according to one or more embodiments of the invention.

FIG. 2 is a block diagram illustrating the methodology underlying weighted divide and conquer according to one or more embodiments of the invention. A dataset S 210 is composed of a number (n) of data points that are arbitrarily scattered with no predetermined pattern. The entire dataset S 210 may be much larger than the space available in main memory (M) that is used to process it (i.e. $|S|>>M$). The dataset S 210 is passed to a partitioning process 215. Partitioning process 215 divides dataset S 210 into P arbitrary, disjoint pieces 220, with each piece being denoted by $S_i$ (i ranging from 1 to P). Presumably, in one embodiment of the invention, P is large enough such that each piece $S_i$ fits in main memory. Thus the number of partitions $P>M/n$, where n is the total number of data points in the dataset S.

The P disjoint pieces 220 are then passed to a cluster process 230, which uses some method A to find k centers such that the centers satisfy a given metric such as minimizing the sum of distances between points and their nearest center. Cluster process 230 generates a set $D_i$ of k centers for each piece $S_i$. These sets $D_i$ 240 each have k centers $d_{ij}$ where j ranges from 1 to k. Thus, for piece $S_1$, cluster process 230 generates a set $D_1$ containing centers $d_{11}$, $d_{12}$, $d_{13}$ ... $d_{1k}$, and for piece $S_2$ cluster process 230 generates a set $D_2$ containing centers $d_{21}$, $d_{22}$, $d_{23}$, ... $d_{2k}$. The sets $D_i$ 240 of k centers are then passed to an assignment & weighting process 245. Assignment and weighting process 245 first assigns each original data point in the set S (as partitioned into pieces $S_i$) to its nearest center. After assigning all points to their nearest center, the centers are weighted by assignment & weighting process 245.

The weights applied to the centers are the number of points assigned to the center. Thus, for each center $d_{ij}$ a weight $w_{ij}$ is computed, where $w_{ij}$ is the number of points in $D_i$ closer to $d_{ij}$ than to any other center $d_{ik}$, k not equal to j. The set of all weights $w_{ij}$ for a given i is designated as set $W_i$. The sets $W_i$ of weights 250 are all sent to a merging process 260 so that a uniform set of weights is created. Merging process 260 combines in a union operation all the disjoint sets 250 of weights weights $W_i$. A combined dataset D' 270 of merged weighted centers is the result of merging the centers 240 with the weights 260. Dataset 270 is clustered by a clustering process 280 that is similar to clustering process 230 in that it finds another k centers. The clustering process should accordingly take the weights $w_{ij}$ of points into account while computing a clustering. The final k centers 290 are $C_1$, $C_2$, ... $C_K$ and are a clustering of the merged weighted centers D' 270.

Figure 3:
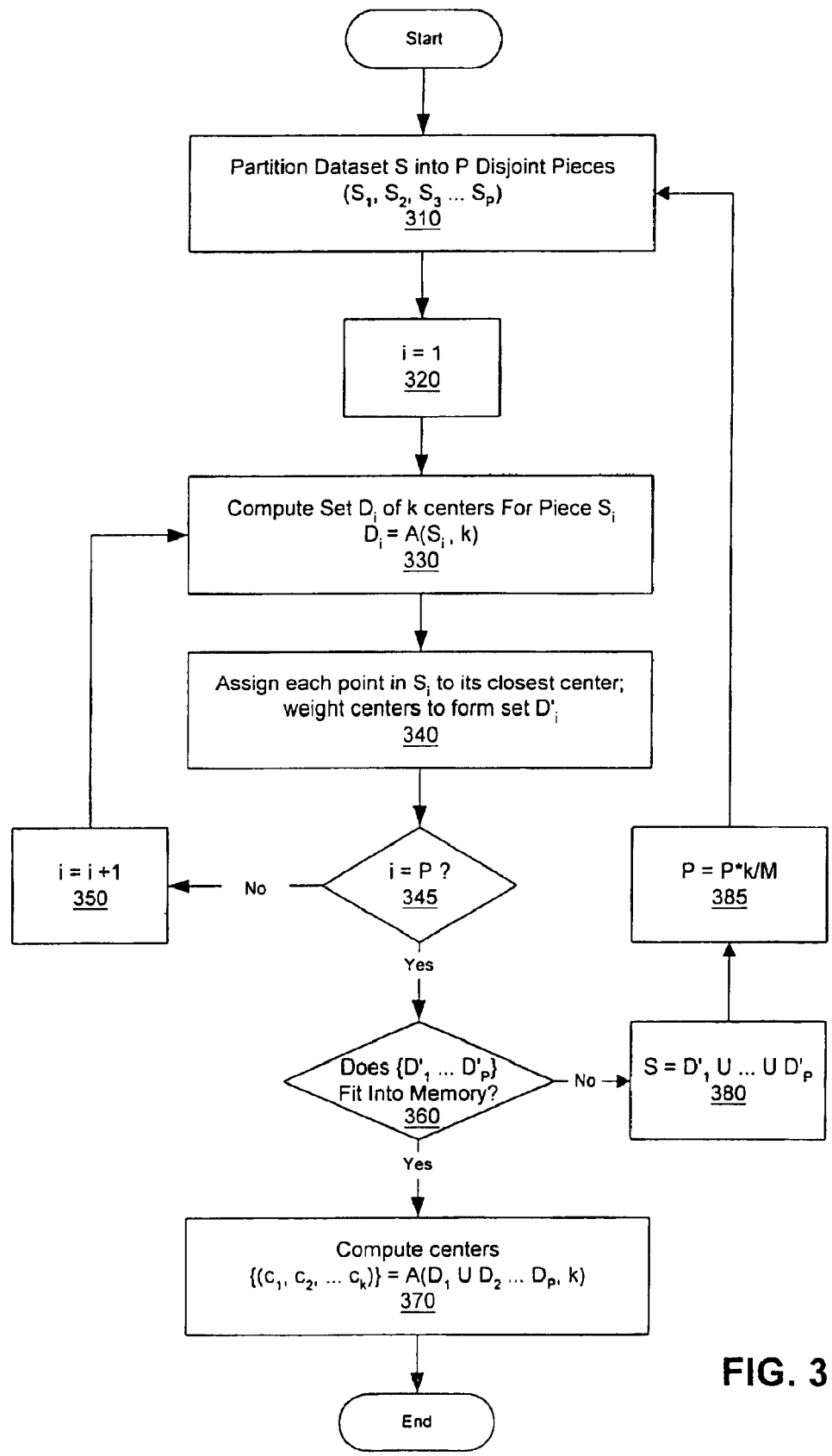
FIG. 3 is a flowchart illustrating at least one embodiment of the invention.

FIG. 3 is a flowchart illustrating at least one embodiment of the invention. A dataset S consisting of n total data points is partitioned into P disjoint pieces, $S_1$, $S_2$, ... $S_P$ (block 310). The partitioning enables the entire dataset S to be reduced to a sequence of P smaller datasets (pieces) that each have approximately n/P data points. Each piece is processed separately, and thus, a variable "i" is utilized to track which piece is under consideration. The variable "i" is first initialized to one such that $S_i$ is initially $S_1$ or the first of the disjoint pieces (block 320).

A clustering algorithm or method A is then called in order to generate a set $D_i$ of k centers (block 330). The method A may be any clustering method that takes as input a set $S_i$ of data points and k, the number of centers to compute. The k centers of $D_i$ that are generated from $S_i$ are $d_{i1}$, $d_{i2}$, ... $d_{ik}$. Each point in $S_i$ is then assigned to its closest center $d_{ij}$ (block 340). The nearest center to a point q is determined by finding the minimum of $dist(q,d_{ij})$ where q is a data point belonging to $S_i$ and $d_{ij}$ is one of k centers found for $S_i$, for all j ranging from 1 to k. The function dist may be a function such as that which finds the Euclidean distance between two points.

Once all points are assigned to their nearest center, each of the centers is weighted by the number of points assigned to them (block 340). If the tracking variable "i" equals P (checked at block 345), the number of disjoint pieces of the dataset S, then, one iteration of the weighted divide and conquer is completed. If not, then the variable "i" is incremented (block 350) so that the next k centers of the next $S_i$ can be found. Thus, after incrementing the variable "i", flow returns to block 330 which calls the method A for the next piece $S_i$ to find another k centers.

If i=P (checked at block 345), then all of the partitioned pieces $S_i$ of the dataset will have been clustered thereby finding centers that are then weighted. If the sets of weighted centers {$D'_1$, $D'_2$, ... $D'_P$} fit in memory, then the sets of centers will undergo a final clustering to find among them another k centers (block 370). The final clustering is performed by calling the clustering method A (used in clustering at block 330) on the merged dataset represented by the union of all sets of weighted centers $D'_1$, $D'_2$, ... $D'_P$ (i.e. $D'_1 \cup D'_2 ... \cup D'_P$)(block 370). This generates a final set of k centers $c_1$, $c_2$, ... $c_k$.

If the completed sets of weighted centers {$D'_1$, $D'_2$, ... $D'_P$} do not fit in memory (checked at block 360), then according to one embodiment of the invention, weighted divide and conquer can be recursively performed until {$D'_1$, $D'_2$, ... $D'_P$} does fit in memory. The data structure S is replaced with the union of the sets of weighted centers $D'=(D'_1 \cup D'_2 ... \cup D'_P)$(block 380). Also, the number of pieces will decrease to Pk/M. Thus the number of partitioned pieces decreases with each iteration (block 385). Flow then returns to block 310, with the blocks 310–360 being repeated for the merged weighted centers. When the iteratively resulting sets of merged weighted centers finally yields a set that can fit within memory, then the final centers are computed (block 370) completing thereby the clustering process. While in some cases only one iteration of the weighted divide and conquer would be required, the process can be called again and again until the proper size of the clustered data can be guaranteed. Each iteration may lessen the quality of the clustering that finally results in that it may be a constant-factor further from a single iteration clustering (see below).

Figure 4:
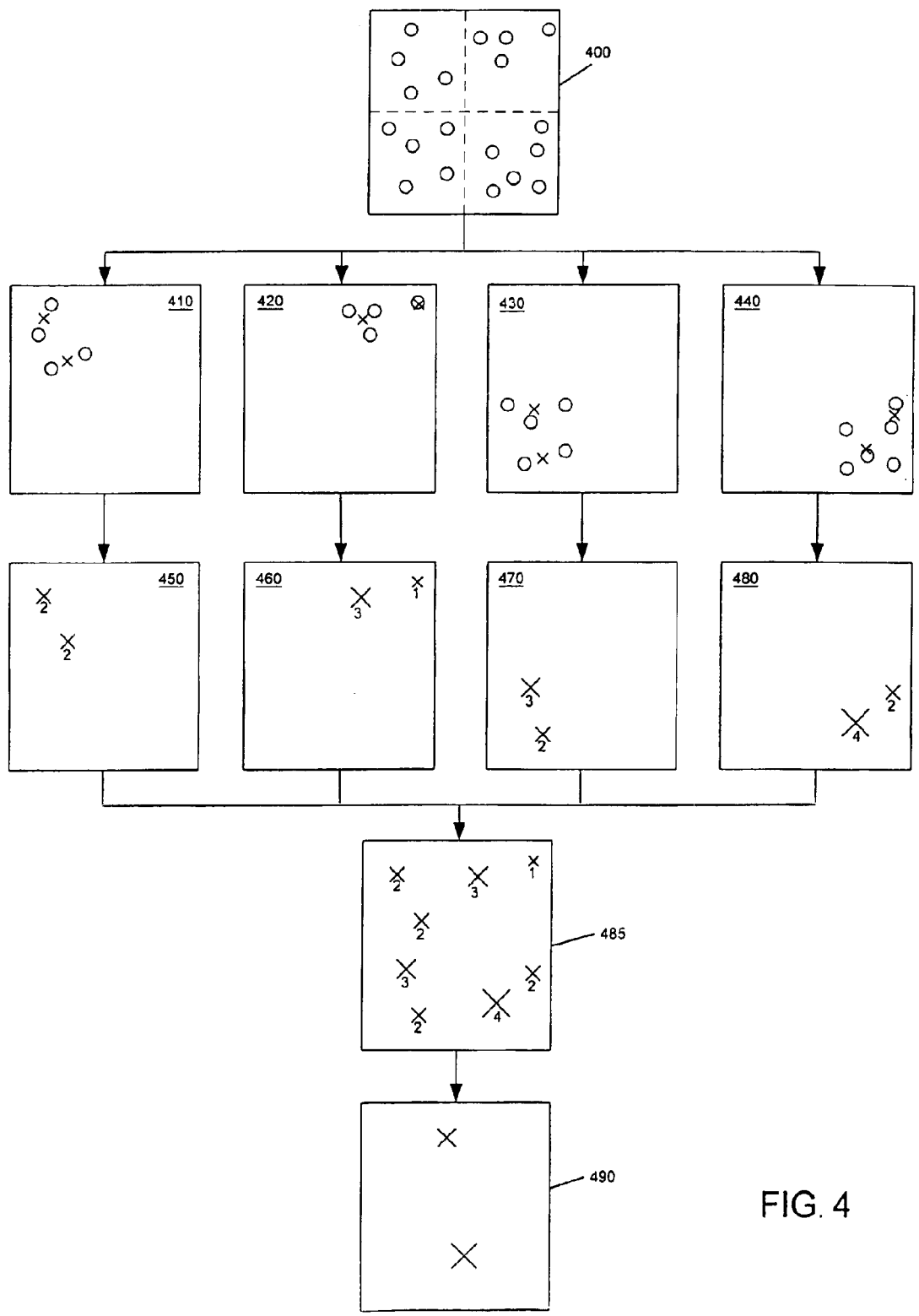
FIG. 4 exemplifies weighted divide and conquer according to one or more embodiments of the invention.

FIG. 4 exemplifies weighted divide and conquer according to one or more embodiments of the invention. The entire dataset 400 is composed of a number of data points (represented by circles) and can be partitioned into an arbitrary number of disjoint pieces. The dashed lines represent the partitioning of dataset 400 into four distinct, disjoint pieces. These pieces 410, 420, 430 and 440 are separately and independently "clustered" according to a given clustering method A which finds k centers for the data points in each piece. In this example, we consider a k equal to two. Clustering each piece 410, 420, 430 and 440 under such constraints will generate two centers (represented by a cross) for each piece. The centers shown for each piece (410, 420, 430, and 440) assume that the clustering was performed as a continuous as opposed to discrete process. In continuous space clustering, the locations of centers found do not have to correspond to locations of data points but may be located anywhere in the space. Discrete clustering also works in a similar manner, and though not exemplified, can readily be understood by one of skill in the art. In discrete clustering, each of the centers found would correspond to the location of one of the data points. The various embodiments of the invention can use either continuous or discrete clustering, as desired, with only a small constant-factor differential in clustering quality.

According to the invention, the data points of each piece (410, 420, 430 and 440), are assigned to their closest/nearest center. The centers are then weighted with the number of points that have been assigned to it. This indicates the relative importance of a center in comparison to other centers in the same piece. For instance in piece 410, two data points would have been assigned to each center, giving each center a weighting of 2. Relative to one another, they carry equal information about the data that the center represents (clusters). Referring to piece 420, one center would have had three data points assigned to it while the other center would have only one point assigned it. Thus, one center would carry a weighting of 3 while the other would carry a weighting of 1. For piece 430, one center has a weighting of three and the other a weighting of 2. For piece 440, one center has a weighting of 4 while the other has a weighting of 2.

The weighted centers form new data pieces, shown as pieces 450, 460 470, and 480. The weighted centers resulting from clustering and weighting piece 410 are shown in piece 450. The weighted centers resulting from clustering and weighting piece 420 are shown in piece 460. The weighted centers resulting from clustering and weighting piece 430 are shown in piece 470. The weighted centers resulting from clustering and weighting piece 440 are shown in piece 480. The pieces 450, 460, 470 and 480 are merged to form a new dataset 485 of weighted centers. The dataset 485 of merged weighted centers is subjected to clustering, taking into account the weighting of the centers to find a final set of centers. The final set of centers 490 is the end result of applying weighted divide and conquer clustering upon dataset 400.

Figure 5:
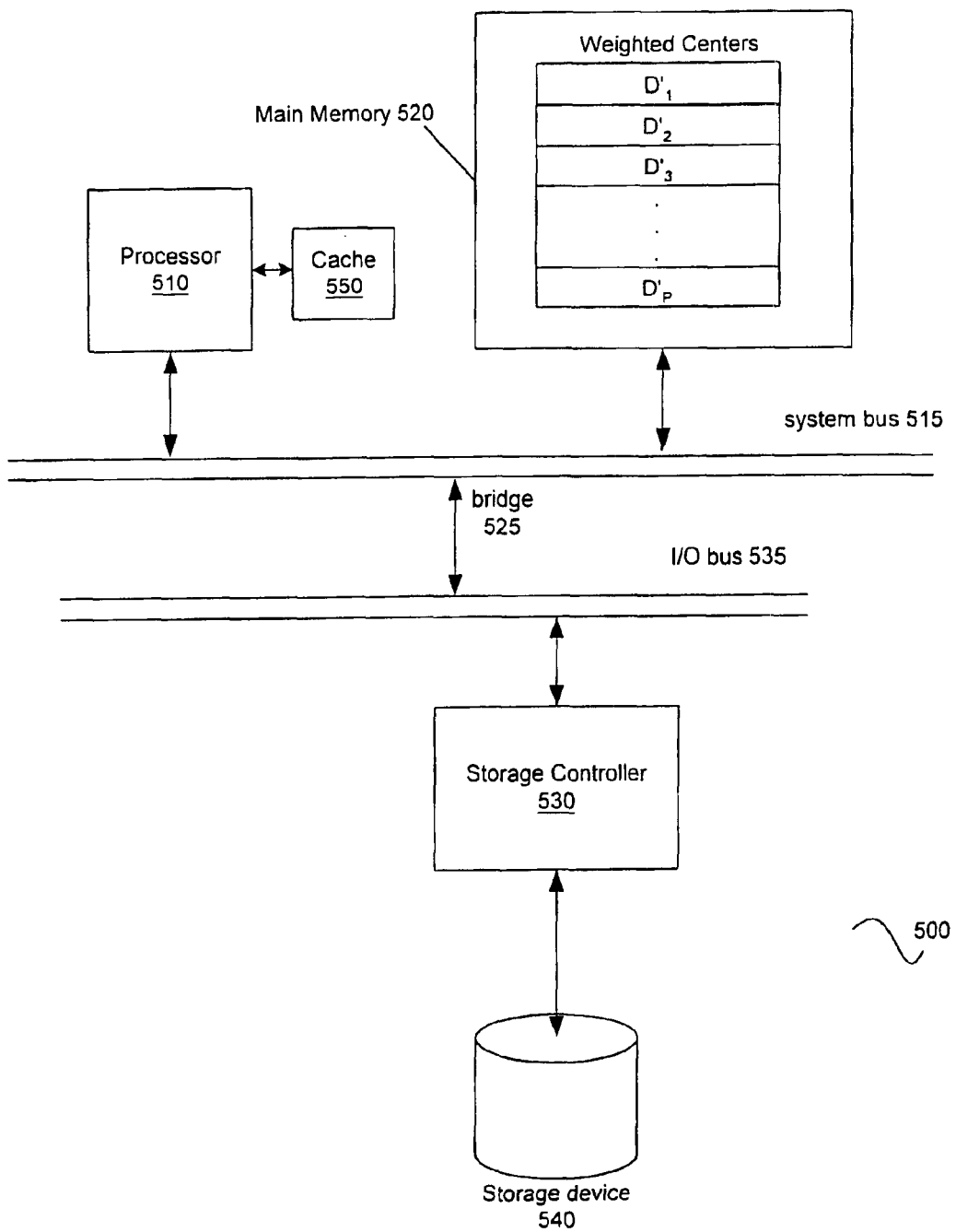
FIG. 5 illustrates a information processing device capable of implementing one or more embodiments of the invention.

FIG. 5 illustrates an information processing device capable of implementing one or more embodiments of the invention. Computer system 500 may be any one of a desktop/mobile computer, server, information device or other general/special purpose computing machine which is capable of carrying out various embodiments of weighted divide and conquer clustering according to the invention. System 500 features a system bus 515 for allowing core internal components, such as a processor 510 and a main memory 520, to communicate with each other. Main memory 520 may consist of random access memory (RAM), in any of its varieties, and/or any other volatile storage mechanism. Main memory 515 operates to store instructions that are to be executed by processor 520. Main memory 515 also may be used for storing temporary variables or other intermediate result data during execution of instructions by processor 510. Computer system 500 also has a bridge 525 which couples to an I/O (Input/Output) bus 535. I/O bus 535 connects to system 600 various peripheral and I/O devices such as a storage controller 530 which then connects to a permanent storage device 540. Storage device 540 may be any storage device capable of storing large amounts of data such as a hard disk drive. Computer system 500 may also have a "cache" 550, which is temporary additional memory that the processor can transact with directly without having to go over a system or other bus.

To process a massively large dataset using conventional clustering techniques, the program executed by processor 510 either swaps data in and out of main memory 520 and/or the program transacts numerous I/O operations with the storage device 540. Such swapping of large amounts of data and transacting with storage device 540 involves a number of latencies. First, data must be read/written through storage controller 530. Second, data must be transferred along the I/O bus 535, and across bridge 525 before either main memory 520 or processor 510 can make use of it. This leads to a degradation in performance despite the attempts of such clustering techniques to reduce the computational complexity of its algorithm. While such techniques may address the load on the processor 510, they do not address the I/O latency that very large datasets pose. Also, since many of these techniques require more than one pass through the dataset, the I/O latency degrades time performance even further.

The weighted divide and conquer method of the present invention improves I/O efficiency because a very large dataset, which may initially be stored in storage device 540, is partitioned into smaller subsets (pieces) of data each of which are stored in main memory 520, in turn. The clustering computation may be executed on these subsets without any data swapping to the storage device 540. In one embodiment of the invention, if the original partitioning of the dataset does not yield a size sufficiently small to fit in main memory 520, then the size of sets of weighted centers are tested. If the sets of weighted centers do not fit in main memory 520, then the weighted divide and conquer can be called iteratively until they do fit. In addition, other size criteria can be established to further boost performance. For instance, the dataset or set of weighted centers could be partitioned until they are able to fit within cache 550 instead of main memory 520.

The weighted divide and conquer clustering technique, as described in various embodiments of the invention, can be included as part of data processing software or as a stand-alone application executing on processor 510 when loaded into memory 520. Such application programs or code implementing weighted divide and conquer, can be written by those of skill in the art in a source language such as C++ and may be compiled and stored as executable(s) on storage device 540. As part of an application program, such code may be pre-compiled and stored on a disc such as a CD-ROM and then loaded into memory 520 and/or installed onto storage device 540.

Scalable

The weighted divide and conquer technique presented above is scalable to any size of dataset. Most clustering methods fall into one of two categories, either 1) scan through the dataset S multiple times or 2) repeatedly access a data structure L that holds the distance between all pairs of points in S. If the size of memory constraint is M, then clustering of large datasets assumes that $|S|>>M$. Either category poses problems of running out of memory or swapping to disk too many times causing significant time-expensive I/O activity. Weighted divide and conquer splits the dataset S into P pieces $S_1, S_2, \ldots S_P$, each of which are of a size less than M.

For the conquer step much less memory is needed since most clustering methods can be modified to work just with the centers and the weights. For instance, if the data structure L' holds the centers $D'=\{d_{ij}: i=1, \ldots, P; j=1, \ldots, k\}$ and their respective weight $W=\{w_{ij}: i=1, \ldots, P; j=1, \ldots, k\}$, then $|L'|$ is $O(k*P)$ and the conquer step can be performed with just L' in memory. Since $|L'|$ is significantly smaller than $|L|$, the conquer step can be performed with much less memory.

The weighted divide and conquer is therefore scalable, so that if L' fits the memory constraint M (i.e. if $|L'|<M$), then all the computations can be performed within main memory (or other memories having size M). If L' does not fit in main memory then L' can be partitioned into kP/M pieces and the process repeated. The resulting weighted centers can be repeatedly subjected to weighted divide and conquer until it fits into main memory. Each successive divide and conquer potentially worsens the quality of the clustering, but does so within a multiple of a constant factor (see below, section entitled Performance).

Incremental

If a set of points $N_1$ has already been clustered and an extra collection of points $N_2$ is added to the space, the technique used should be able to efficiently compute the clustering of $N_1 \cup N_2$ and preferably, without reclustering from scratch the entirety of $N_1 \cup N_2$. Weighted divide and conquer meets this definition of an "incremental" method.

A clustering technique can be considered incremental if, given the sequence of sets of points $N_1, N_2, \ldots, N_R$ ($N_i \subset R^D$), the technique outputs k centers after processing each $N_u$ in time polynomial in $|N_i|$, i and if at each increment i, the ratio of the clustering produced by the algorithm to the optimum clustering is bounded by some fixed constant. As "i" (the index of the set being processed) increases, the technique is permitted by definition to take more time. Further, while permitted time to process each $N_i$, the technique is not permitted under the definition to reprocess any previous sets $N_v$ (v<i).

The weighted divide and conquer technique of the present invention can be considered an incremental technique. Assume A is the clustering method that given a set of (possibly weighted) points and a number of clusters k to find, returns a set of k centers $\{d_1, \ldots, d_k\}$ and corresponding weights $|D_1|, \ldots, |D_k|$. Suppose also that data already processed is $N_1, \ldots, N_{i-1}$ and their computed centers are $d_{v1}, \ldots, d_{vk}$ with corresponding weights $|D_{v1}|, \ldots, |D_{vk}|$ for each previous increment $v=1, \ldots, i-1$. Using weighted divide and conquer, a k median clustering of $N_1 \cup \ldots \cup N_i$ can be obtained by clustering $N_i$ and then clustering all the weighted centers. Thus, first, compute $A(N_i,k)$ and then compute $A(\{(d_{yz}, w_{yz}): y=1, \ldots, i; z=1, \ldots, k\}, k)$. If A runs in time $t(n,k,D)$, where D is the dimension, then at each increment the time taken is $t(|N_i|,k,D)+t(ik^2,k,D)$. Further, the clustering quality at each increment i is a 5β approximation to the optimum sum of squares clustering of $N_1 \cup \ldots \cup N_i$ assuming Euclidean distance, where β is the factor guaranteed by the best approximation method (see Performance section below).

Figure 6:
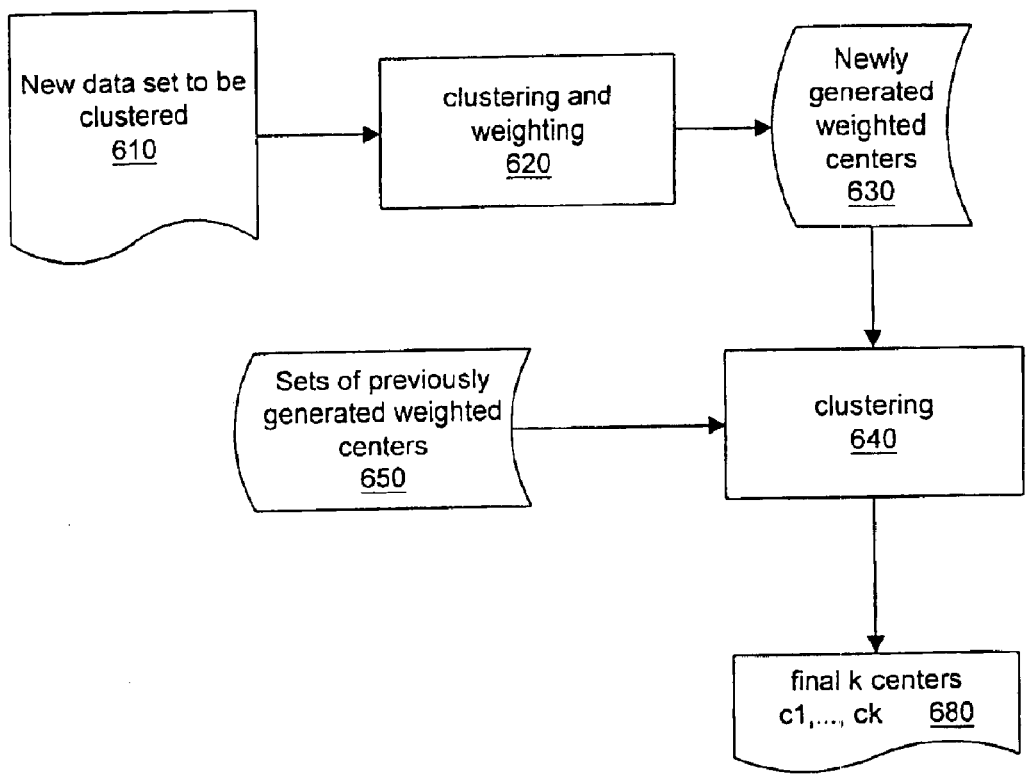
FIG. 6 further illustrates how weighted divide and conquer can be incrementally performed.

FIG. 6 further illustrates how weighted divide and conquer can be incrementally performed for 2 increments. Assume that there exists a previously clustered and weighted set of centers 650, and that a new data set 610 is incrementally added to the space. In conventional non-incremental techniques, the process of weighting and clustering would have to be performed again from scratch, with the previously attained centers being irrelevant. But, according to the invention, the new data set can separately be clustered and those centers weighted (block 620) without regard to the previously clustered data sets. The resulting newly generated weighted centers 630 are input along with the sets 650 of previously generated weighted centers to be clustered (block 640). Clustering process 640 clusters the weighted centers obtained by 630 and 650. The resulting final k centers $c_1, \ldots, c_k$ 680 represent the clustering by weighted divide and conquer of the union of the new data set 610 with an existing data set that generated sets 650 of weighted centers.

Parallel

Since weighted divide and conquer operates on a set of data points independent of other sets, the datasets can be partitioned and each piece concurrently processed in parallel. If a computer system has a number of processors H each with its own memory space, then each processor can cluster one of H pieces in parallel. During the divide portion, no interprocess communication is needed, and during the conquer portion of the technique all of the weighted centers can be merged and operated upon by one processor. If the method runs in time $t(n,k,d)$ then its time when parallel processed is $t(n/H,k,d)+t(Hk,k,d)$. In a shared memory environment each processor accesses a physically separate part of memory.

Performance, Quality & General Properties

The weighted divide and conquer technique achieves a constant-factor approximation to an optimal clustering scenario. To describe the constant factor approximation property is to state that, given the weighted divide and conquer method ALG which runs a clustering method A under clustering quality f(x), then ALG(S,k,A) will generate k centers $c_1, \ldots, c_k$ such that $$\sum_{x \in S} f\left(\min_{u=1,\ldots,k} dist(x, c_u)\right) \leq \alpha\beta(1 + 2\alpha)OPT_{S,f,k}$$

provided that α, β, dist, OPT and f(x) follow the following constraints:

1) the dist function (distance) satisfies the triangle inequality: i.e. for all $x,y,z \in R^D$ (all points x,y,z in space $R^D$), $dist(x,z) \leq dist(x,y)+dist(y,z)$; and 2) f(x) is a strictly monotone increasing function i.e. a) $[x \leq y] \rightarrow [f(x) \leq f(y)]$ and b) for all $x,y,z \in R^D$ (all points x,y,z in space $R^D$), $f(dist(x,y)+dist(y,z)) \leq \alpha[f(dist(x,y))+f(dist(y,z))]$ for some fixed α.

3) $OPT_{S,f,k}$ is the optimum clustering of S into k clusters assuming clustering quality f(x), i.e., $$OPT_{S,f,k} = \min_{c_1,\ldots,c_k} \sum_{x \in S} f\left(\min_{u=1,\ldots,k} dist(x, c_u)\right)$$

4) The clustering method A is a β-approximation to the optimum clustering $OPT_{S,f,k}$.

In particular, if f(x)=x, the identity function, which means minimizing the sum of distances from points to final resulting centers, then it can be shown that:

$$\sum_{x \in S} \min_{u=1,\ldots,k} dist(x, c_u) \leq 3\beta OPT_{S,f,k}.$$

Likewise, if the error metric is the sum of squared distances from points to centers, then $f(x)=x^2$, and it can be shown that:

$$\sum_{x \in S} \min_{u=1,\ldots,k} dist(x, c_u)^2 \leq 10\beta OPT_{S,f,k}.$$

Further, it can be shown that if dist is the Euclidean distance function, e.g., the distance between a point with coordinates $(x_1, y_1)$ and a point with coordinates $(x_2, y_2)$ is $$dist((x_1,y_1),(x_2,y_2)) = \sqrt{(x_1-x_2)^2 + (y_1-y_2)^2},$$

then:

$$\sum_{x \in S} \min_{u=1,\ldots,k} dist(x, c_u)^2 \leq 5\beta OPT_{S,f,k}.$$

Thus, by using the Euclidean distance metric, the clustering quality can be improved by a factor of 2 from that of the general sum of squares case.

Further, discrete algorithms can be shown to behave as stated above for the continuous case, but within a factor of $2\alpha$ of one another. The proofs of the above properties are not described but can be readily derived by one of skill in the art.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method for clustering a set S of n data points to find k final centers, comprising:
   partitioning said set S into P disjoint pieces $S_1, \ldots, S_P$;
   for each said piece $S_i$, determining a set $D_i$ of k intermediate centers;
   assigning each data point in each piece $S_i$ to the nearest one of said k intermediate centers;
   weighting each of said k intermediate centers in each set $D_i$ by the number of points in the corresponding piece $S_i$ assigned to that center; and
   clustering said weighted intermediate centers together to find said k final centers, said clustering performed using a specific error metric and a clustering method A.

2. The method according to claim 1 wherein P is sufficiently large enough such that each piece Si obeys the constraint $|S_i|<M$, where M is the size of a physical memory or a portion thereof to be used in processing said each piece.

3. The method according to claim 1 wherein said clustering is performed upon iteratively obtained weighted intermediate clusters.

4. The method according to claim 1 wherein said set S is replaced by weighted intermediate centers of the previous iteration when iteratively performing said partitioning, determining, assigning, and weighting.

5. The method according to claim 1 wherein said determining is performed using said specific error metric and said clustering method A.

6. The method according to claim 1 wherein said specific error metric is the minimizing of the sum of the squares of the distances between points and their nearest centers.

7. The method according to claim 6 wherein the distance is the Euclidean distance.

8. The method according to claim 1 wherein said specific error metric is the minimizing of the sum of the distances between points and their nearest centers.

9. The method according to claim 8 wherein the distance is the Euclidean distance.

10. The method according to claim 1 wherein said clustering method is an approximation-based method.

11. The method according to claim 1 further comprising:
    considering a second set of data points for obtaining a second k final centers after said set S is clustered;
    repeating partitioning, determining, assigning and weighting for said second set of data points; and
    clustering weighted intermediate centers obtained from said second set of data points together with said weighted intermediate centers obtained from said data set S, said clustering performed using said specific error metric and said clustering method A.

12. The method according to claim 1 wherein said partitioning, determining, assigning and weighting is performed in parallel for each piece $S_i$.

13. An article comprising a computer readable medium having instructions stored thereon which when executed causes clustering a set S of n data points to find k final centers, said clustering implemented by:
    partitioning said set S into P disjoint pieces $S_1, \ldots, S_P$;
    for each said piece $S_i$, determining a set $D_i$ of k intermediate centers;
    assigning each data point in each piece $S_i$ to the nearest one of said k intermediate centers;
    weighting each of said k intermediate centers in each set $D_i$ by the number of points in the corresponding piece $S_i$, assigned to that center; and
    clustering said weighted intermediate centers together to find said k final centers, said clustering performed using a specific error metric and a clustering method A.

14. The article according to claim 13 wherein P is sufficiently large enough such that each piece $S_i$, obeys the constraint $|S_i|<M$, where M is the size of a physical memory or a portion thereof to be used in processing said each piece.

15. The article according to claim 13 further implemented by:
    considering a second set of data points for obtaining a second k final centers after said set S is clustered;
    repeating partitioning, determining, assigning and weighting for said second set of data points; and
    clustering weighted intermediate centers obtained from said second set of data points together with said weighted intermediate centers obtained from said data set S, said clustering performed using said specific error metric and said clustering method A, resulting in said second k final clusters.

16. The article according to claim 13 wherein said partitioning, determining, assigning and weighting is performed in parallel for each piece S.

17. An apparatus for clustering a set S of n data points to find k final centers, said apparatus comprising:
    a main memory;
    a processor coupled to said memory, said processor configured to partition said set S into P disjoint pieces $S_i, \ldots, S_P$ such that each piece $S_i$ fits in main memory, said each piece $S_i$ first stored separately in said main memory and then clustered by said processor performing:

for each said piece $S_i$, determining a set $D_i$ of k intermediate centers;

assigning each data point in each piece $S_i$, to the nearest one of said k intermediate centers;

weighting each of said k intermediate centers in each set $D_i$ by the number of points in the corresponding piece $S_i$, assigned to that center; and clustering said weighted intermediate centers together to find said k final centers, said clustering performed using a specific error metric and a clustering method A.

18. An apparatus for clustering a set S of n data points to find k final centers, said apparatus comprising:

a main memory;

a plurality of processors coupled to said main memory, one of said processors configured to partition said set S into P disjoint pieces $S_1, \ldots, S_P$ such that each piece $S_i$, fits in main memory, said each piece $S_i$, first stored separately in said main memory and then clustered by each said processor performing:

for each said piece $S_i$, determining a set $D_i$ of k intermediate centers;

assigning each data point in each piece $S_i$, to the nearest one of said k intermediate centers; and weighting each of said k intermediate centers in each set $D_i$ by the number of points in the corresponding piece $S_i$, assigned to that center, further wherein after said weighting, one of said processors finally clustering said weighted intermediate centers together to find said k final centers, said clustering performed using a specific error metric and a clustering method A.

* * * * *